W. C. STIFF.
Bale-Ties.
No. 140,556.
2 Sheets--Sheet 1.
Patented July 1, 1873.
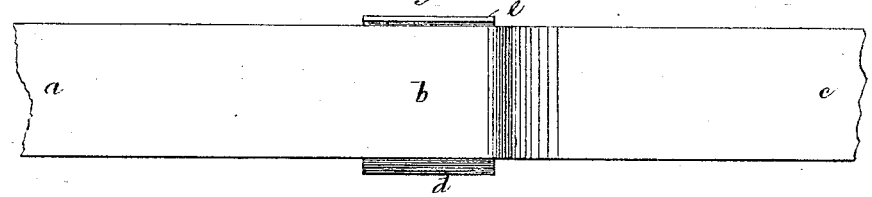
Fig. I
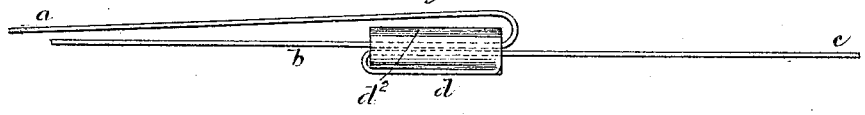
Fig. II
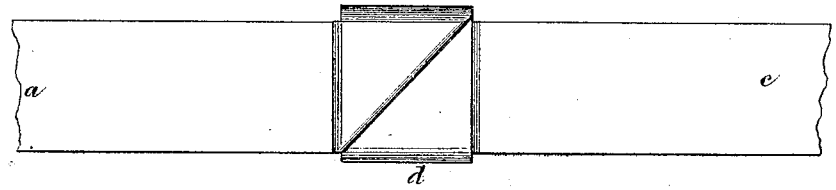
Fig. III
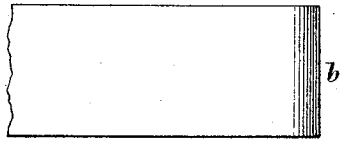
Fig. IV
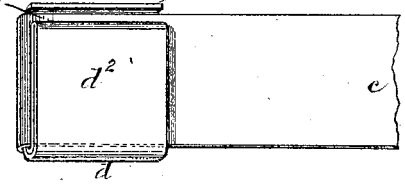
Fig. V
Fig. VI
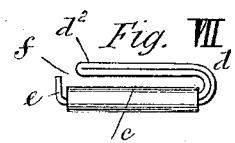
Fig. VII
Witnesses,
George Shaw
Richard Skerrett
Inventor
William Charles Stiff W. C. STIFF.
Bale-Ties.
No. 140,556.
2 Sheets--Sheet 2.
Patented July 1, 1873.
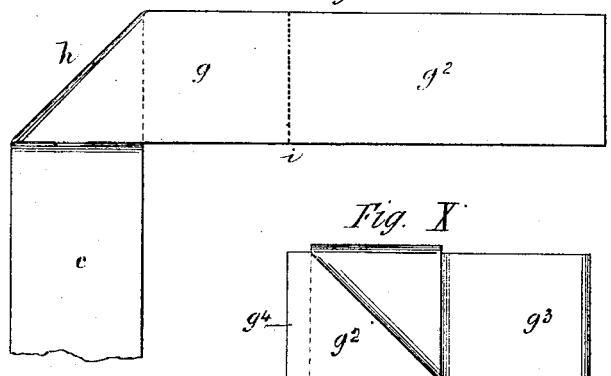
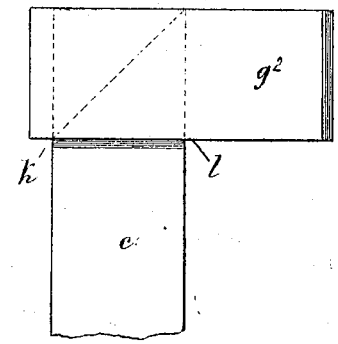
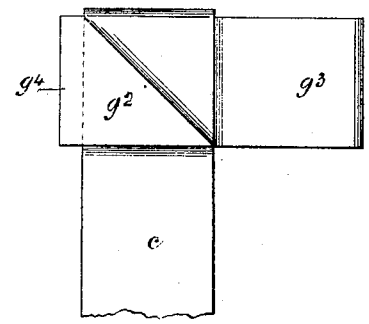
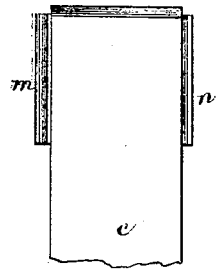
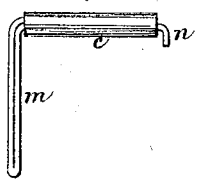
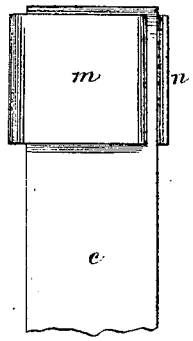
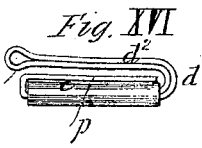
Witnesses.
George Shaw
Richard Skerrett
Inventor
William Charles Stiff

UNITED STATES PATENT OFFICE.

WILLIAM C. STIFF, OF BIRMINGHAM, ENGLAND.

IMPROVEMENT IN BALE-TIES.

Specification forming part of Letters Patent No. 140,556, dated July 1, 1873; application filed June 11, 1873.

*To all whom it may concern:*

Be it known that I, WILLIAM CHARLES STIFF, of Birmingham, in the county of Warwick, England, merchant and manufacturer, have invented certain Improvements in Fastenings for Metallic Hoops or Bands used in Baling Cotton and other substances, of which the following is a specification:

My invention consists in constructing fastenings for connecting the ends of the said metallic hoops or bands together, from the hoop or band itself, in the manner hereinafter described and illustrated in the accompanying drawings, whereby the use of the detached tie or buckle is dispensed with.

In constructing fastenings according to my invention I form on one end of the band a hook, made by doubling a portion of the band upon itself in the ordinary manner. At the other end of the band I form a transverse loop or eye, with which the said hook engages to fasten the ends of the band together. I form this transverse loop or eye in the following manner: I bend a portion of the end of the band at an angle of ninety degrees, folding the said bent part flat upon the other part of the band. The said folded part stands at right angles to the band, and from this part the transverse loop or eye is made. The said transverse loop or eye is formed by bending the part standing at right angles to the band in such a manner that it forms, at the end of the band, a transverse loop or eye surrounding the end of the band. Between the front face of the band and the front side of the said transverse loop or eye there is sufficient space for the insertion of the hook formed at the other end of the band. The loop, formed as described, has a slot or opening at front and near one edge. In this slot the hook is introduced, by a lateral motion, for the purpose of engaging it with the eye and fastening the ends of the band together.

Figure 1 represents a plan of upper side, Fig. 2 an edge view, and Fig. 3 a plan of under side, of the two ends of a metallic hoop or band connected together by a fastening constructed according to my invention. Figs. 4 and 5 represent the ends of the band detached. Fig. 6 is an edge view of the ordinary hook at one end of the band; and Fig. 7 is an edge view of the fastening on the other end of the band.

The fastening at the end $a$ of the band consists of a hook, $b$, made by doubling or bending a portion of the band or hoop upon itself; and the fastening at the opposite end $c$ of the band consists of a transverse loop or eye, marked $d\ d^2$, the said loop or eye nearly surrounding the end of the band. The upper side $d^2$ of the loop is situated at a short distance from, and is parallel, or nearly parallel, with, the upper side of the end $c$ of the band, and constitutes a strong elastic tongue, between which and the end $c$ of the band the hook $b$ on the other end $a$ of the band is passed to fasten the two ends of the band together. At the edge of one side of the fastening is a lateral shoulder or bearing piece, $e$, standing at right angles, or nearly so, to the band; and between the said lateral shoulder $e$ and the free end of the tongue $d^2$ of the loop is a slot, $f$, (see Figs. 5 and 7.)

In fastening the two ends $a\ c$ of the band together the hook $b$ is introduced, by a lateral motion, through the slot $f$, and pressed forcibly between the tongue $d^2$ and the face of the band $c$. The tongue $d^2$ is thereby made slightly to yield, and permits the hook $b$ to pass into the loop or eye $d\ d^2$, the tongue $d^2$, on the passing of the hook $b$ into the loop, snapping upon it, and the two ends of the band are fastened securely together, as illustrated in Figs. 1, 2, and 3.

By means of the lateral shoulder or bearing $e$ the hook $b$ is prevented from escaping from the loop or eye by any accidental lateral pressure.

I will now describe the manner in which the transverse loop or eye $d\ d^2$ is made from the end $c$ of the band or hoop. I bend a portion of the end of the band or hoop at right angles to the said band or hoop, as illustrated in Fig. 8, where the bent part, standing at right angles, is marked $g\ g^2$, the said part $g\ g^2$ joining the band $c$, by an inclined fold, at $h$. From this bent part $g\ g^2$ the transverse loop or eye hereinbefore described is made. This is effected by first folding or bending the outer end $g^2$ at the dotted line $i$ upon the part $g$, as illustrated in Fig. 9. The part $g^2$ of the band or hoop, Fig. 9, is next folded over on part of the band or hoop $c$ along the line between $k$ and $l$, and the partially-formed fastening assumes the shape represented in Fig. 10. The parts $g^3\ g^4$, Fig. 10, are next bent at right angles to the band $c$, as illustrated in edge view in Fig. 11, and plan of upper side in Fig. 12, in which Figs. 11 and 12 the part $m$ is the part $g^3$ of Fig. 10 after bending; and the part $n$ of the said Figs. 11 and 12 is the part $g^4$ of Fig. 10 after bending. By a further bending the part $m$, Figs. 11 and 12 is folded around the edge of the band $c$ to the front side thereof, so as to lie parallel therewith, as illustrated in plan in Fig. 13, and shown also in end view in Fig. 7. A transverse loop or eye of the kind represented in Figs. 1, 2, 3, 5, and 7 is thus formed at the end of the band $c$.

Some of the parts of the loop or eye may be modified, as follows: Instead of the hook $b$ of the band taking a side bearing against the vertical shoulder $e$, Fig. 7, the said shoulder may be closed upon the face of the band, as illustrated in Fig. 14; or the hook $b$ may be made to take a bearing under the horizontal part at $e$, Fig. 15. In the last case the loop $d\ d^2$ is made broader than in the fastening previously described in order that the hook $b$ may be enabled, after being introduced into the loop, to pass under the said bearing $e$. As a further modification, the band, at the part $g^4$, Fig. 10, may be prolonged, and folded upon the upper side of the band $c$ before the part $g^3$, forming the tongue $d^2$ of the loop, is folded.

A fastening provided with the additional fold described is represented in Fig. 16, where the additional fold is marked $p$. In this fastening the end of the tongue $d^2$ of the loop is expanded, and forms a lateral shoulder, $q$, against which one edge of the hook $b$ bears to prevent the parts from becoming detached by any side motion or strain on the fastening.

Where great strength is not required the additional fold $p$ may be dispensed with; and where extra strength is required the end of the band may be doubled upon itself before the formation of the loop or eye is commenced.

The inner face of the tongue $d^2$ of the loop or eye may be convex, in order that when the hook is introduced it may press against the front of the band and prevent the hook escaping from the eye by any accidental lateral pressure.

The various bendings of the band or hoop herein described for the the manufacture of the fastenings constituting my invention may either be effected by hand-tools or by pressing-tools worked by a press.

Fastenings made as described and illustrated in the drawings are very strong, and need not be of a width much exceeding that of the band.

Although I have described and represented the fastening $d\ d^2$ as made from the end of the band, yet the said fastening may be made from a separate piece of hoop-iron, and be riveted or otherwise secured to the end of the band.

Having now described the nature of my invention, and the manner in which the same is to be performed, I wish it to be understood that I claim as my invention—

A loop or eye for bands or hoops for baling cotton or other substances, substantially such as herein described and illustrated in Figs. 7, 14, 15, 16 of the accompanying drawing, said loop or eye being formed from a portion of the band, or from a separate piece, bent and fashioned in the manner shown and set forth.

WILLIAM CHARLES STIFF. [L. S.]

Witnesses:
   GEORGE SHAW,
   RICHARD SKERRETT,
      37 *Temple street, Birmingham.*